United States Patent [19]
Behtash et al.

[11] Patent Number: 5,745,480
[45] Date of Patent: Apr. 28, 1998

[54] MULTI-RATE WIRELESS COMMUNICATIONS SYSTEM

[75] Inventors: Saman Behtash, Berkeley; Christopher Flores, Oakland; Adel Ghanem, Danville, all of Calif.

[73] Assignee: Adicom Wireless, Inc., Hayward, Calif.

[21] Appl. No.: 681,191

[22] Filed: Jul. 22, 1996

Related U.S. Application Data

[60] Provisional application No. 60/014,766, Apr. 3, 1996.
[51] Int. Cl.$^6$ .................... H04J 13/02; H04Q 7/34
[52] U.S. Cl. .................... 370/252; 370/333; 370/468; 375/200
[58] Field of Search .................... 370/252, 280, 370/281, 333, 335, 336, 342, 345, 465, 468, 477, 479; 375/200, 205; 455/453, 522

[56] References Cited

U.S. PATENT DOCUMENTS

| | | | |
|---|---|---|---|
| 5,396,516 | 3/1995 | Padovani et al. | 375/225 |
| 5,442,625 | 8/1995 | Gitlin et al. | 370/18 |
| 5,581,575 | 12/1996 | Zehavi et al. | 375/200 |
| 5,603,096 | 2/1997 | Gilhousen et al. | 455/69 |
| 5,604,730 | 2/1997 | Tiedemann, Jr. | 370/252 |

*Primary Examiner*—Melvin Marcelo
*Attorney, Agent, or Firm*—Mark A. Haynes; Wilson, Sonsini, Goodrich & Rosati

[57] ABSTRACT

A multi-rate wireless communications system that supports a plurality of distributed user terminals in full-duplex simultaneous communications with a central base station, where each user terminal is provided on demand with one of multiple bit rates at a negotiated QOS is provided. Each user is assigned a variable bit rate, a variable processing gain, a variable transmit power and a unique fixed rate spreading code, resulting in a constant bandwidth signal received at a relative power level corresponding to the negotiated QOS. This application can be applied to systems including wireless local loop and mobile cellular. By adjusting signal energy and interference energy, variable bit rates and negotiated QOS parameters can be supported. The forward link between base-station and user terminal, and the reverse link between the user terminal and base-station, can correspond to either a Frequency Division Duplexing (FDD) arrangement where the forward and reverse links occupy different carrier frequencies but overlap in time, or a Time Division Duplexing (TDD) arrangement where the forward and reverse links occupy the same carrier frequency but are in non-overlapping time intervals.

53 Claims, 8 Drawing Sheets

Block Diagram for User Terminal for FDD Embodiment

FIG. 6

FIG. 7
Block Diagram for User Terminal for TDD Embodiment

FIG. 8

Block Diagram for Base Station for TDD Embodiment

MULTI-RATE WIRELESS COMMUNICATIONS SYSTEM

CROSS-REFERENCE TO RELATED PROVISIONAL APPLICATION

This application claims the benefit of U.S. provisional application Ser. No. 60/014766, filed on Apr. 3, 1996.

FIELD OF THE INVENTION

The present invention relates to wireless communications, and more particularly, to methods and systems that simultaneously support a plurality of distributed user terminals connected to a central base station, each user terminal provided on demand one of multiple bit rates at a negotiated Quality of Service (QOS).

BACKGROUND OF THE INVENTION

Wireless networks today are mainly designed for voice communication in the local loop or mobile cellular environments. This application is adequately handled by fixed bit rate services. On the other hand, wire-line networks have evolved to a point where they can simultaneously support multiple services like voice, data, image, and video, each with different bit rate requirements. An example of such a system is asynchronous transfer mode (ATM). It is found that this flexibility increases efficiency and reduces costs of a telecommunication system. Because wireless telecommunications systems typically follow the trends of wire-line systems, there will soon be a demand for wireless networks to support the same services. Further these services must be supported on a dynamic bandwidth-on-demand basis at varying service-related and/or user-requested Quality of Service (QOS) parameters (e.g., Bit Error Rate (BER)). This is because different bandwidths are required to support different services. For example, voice may require only 32 Kilo-bit per second (Kbps) while data may require 128 Kbps and video may require 1.5 Mbps. Similarly, different services require different QOS parameters (such as BER). For example, voice can tolerate a BER of $10^{-3}$ for a 32 Kbps service whereas data may require BER=$10^{-7}$. Finally these requirements must be satisfied in a cost effective manner both in the efficient use of the precious radio spectrum and the reduction of equipment costs.

Currently, there is no Frequency Division Multiple Access (FDMA) and Time Division Multiple Access (TDMA) system which can support bandwidth-on-demand and variable QOS. In existing art, some FDMA, TDMA and Code Division Multiple Access (CDMA) systems achieve multiple bit rates by aggregating individual channels. An example of such a CDMA system is disclosed in U.S. Pat. No. 5,442,625 entitled "Code Division Multiple Access System Providing Variable Data Rate Access To A User." The system in the '625 patent supports a channel of rate M×R by establishing M channels each of rate R. This is an expensive solution as it requires baseband hardware for simultaneous support of M channels, which is wasteful at the user terminals, especially if M is large or the high bandwidth is only required occasionally.

SUMMARY OF THE INVENTION

The present invention is a flexible multi-rate wireless communications system that supports a plurality of distributed user terminals in full-duplex simultaneous communications with a central base station, where each user terminal is provided on demand with one of multiple bit rates at a negotiated QOS. One embodiment of this system is based on CDMA with each user assigned a variable bit rate, a variable processing gain, a variable transmit power, and a unique fixed rate spreading code, resulting in a constant bandwidth signal received at a relative power level corresponding to the negotiated QOS. The above embodiment can be implemented in Frequency Division Duplexing (FDD) and Time Division Duplexing (TDD) configurations. The applications for this system include wireless local loop, mobile cellular, and wireless multimedia access systems.

The BER QOS parameter for an individual user terminal in a CDMA system depends on the received Signal-to-Interference ratio (S/I). The signal energy S is determined by two factors: (i) the received user signal energy per chip, and (ii) the combination (determined by the auto-correlation properties of the spreading codes) of the user energy per chip over the number of chips per user bit duration. The interference energy I is determined by the sum of interference energy for all the other users. The interference energy from each of the other users is determined by two factors: (i) the received signal energy per chip of the other user, and (ii) the combination (determined by the cross-correlation properties of the spreading codes) of the energy per chip of the other user over the number of chips per bit duration. By adjusting the two factors in signal energy and the two factors in the interference energy (i.e., a total of four factors), variable bit rates and negotiated QOS parameters can be supported. Further, by keeping the channel bandwidth fixed for all bit rates the equipment costs, particularly the RF stage where the components (e.g., filters) have fixed bandwidths, will be reduced.

Further, the forward link (i.e., from base-station to user terminal) and the reverse link (ire., from the user terminal to base-station) can correspond to either a FDD arrangement where the forward and reverse links occupy different carrier frequencies but overlap in time or a TDD arrangement where the forward and reverse links occupy the same carrier frequency but are in non-overlapping time intervals.

It should be noted that in the current invention, the channels are resized based on the factors described above. This is different from the aggregation method used in the prior art.

These and other features of the present invention will become apparent from the following description when read in conjunction with the drawings and the appended claims.

DETAILED DESCRIPTION OF THE INVENTION

The present invention comprises a novel wireless communication system and related methods. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
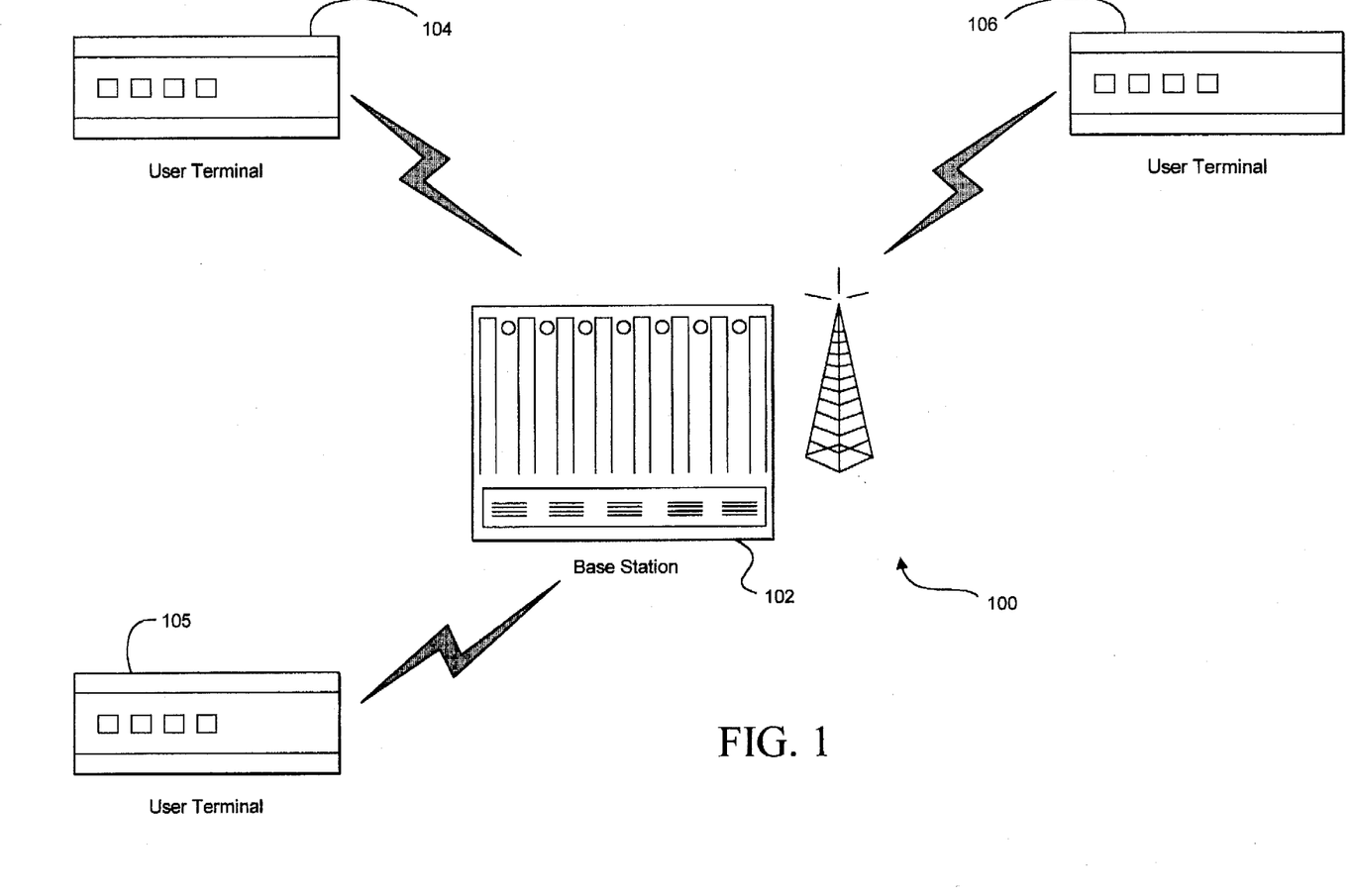
FIG. 1 is a schematic diagram of a wireless system of the present invention.

FIG. 1 is a schematic diagram of a wireless communications system 100 of the present invention. It comprises a base station 102 and a plurality of user terminals, such as stations 104–106. The terminals connect to user applications (e.g. voice, data, video) while the base-station connects to a telecommunications network. The base station and individual user terminals negotiate bit rates and QOS parameters using, the systems and methods disclosed below.

Figure 2:
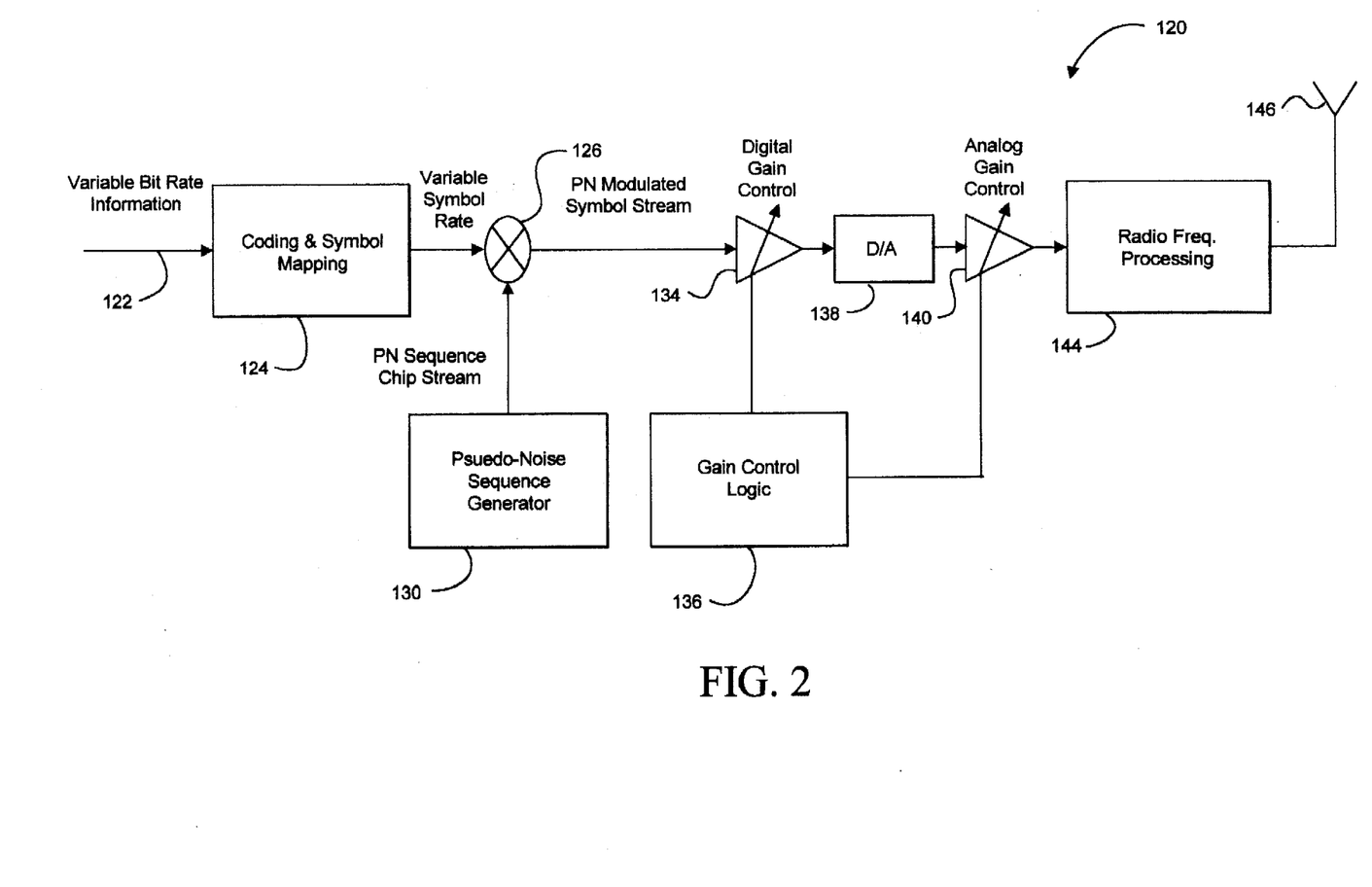
FIG. 2 is a block diagram of a transmitter portion of a user terminal of the present invention.

FIG. 2 is a schematic diagram of a transmitter portion 120 of a user terminal in one of the user terminals of FIG. 1. Transmitter portion 120 contains a coding and symbol mapping unit 124 which accepts variable bit rate data from a signal path 122 and generates symbols of variable rate. The symbols are coupled to a multiplier 126 which multiplies the symbols with a pseudo-noise (PN) sequence chip stream generated by a PN sequence generator 130. As a result, a PN modulated symbol stream is generated. This stream is coupled to a digital gain control unit 134. The gain of unit 134 is managed by a gain control logic 136. The output of unit 134 is coupled to a digital-to-analog (D/A) converter 138 which converts the digital data into analog form. The analog, signal is coupled to an analog gain control unit 140 which changes the amplitude of the analog signal. The gain of unit 140 is also managed by gain control logic 136. In the present invention, gain control logic 136 could be a digital or an analog device, or a combination of the two. The output of unit 140 is coupled to a radio frequency processing unit 144 which modulates the incoming analogy signal into a high frequency signal suitable for radio transmission using an antenna 146. Note that both analog, gain control unit 140 and digital gain control unit 134 serve the same function (i.e., to control the gain of signals) although they operate in the analog, and digital domains, respectively. The (optional) use of two gain control units allow maximum gain control range to be achieved or the gain to be controlled more finely (i.e. analog for coarse gain control, digital for fine gain control).

As explained in more detail below, the user terminal negotiates with the base station a bit rate and an allowable transmission power based on user's requested service and desired QOS. This negotiation may occur at connection setup or during a connection. Gain control logic 136 adjusts the gains of digital gain control unit 134 and analog gain control unit 140 in accordance with the negotiated value.

Figure 3:
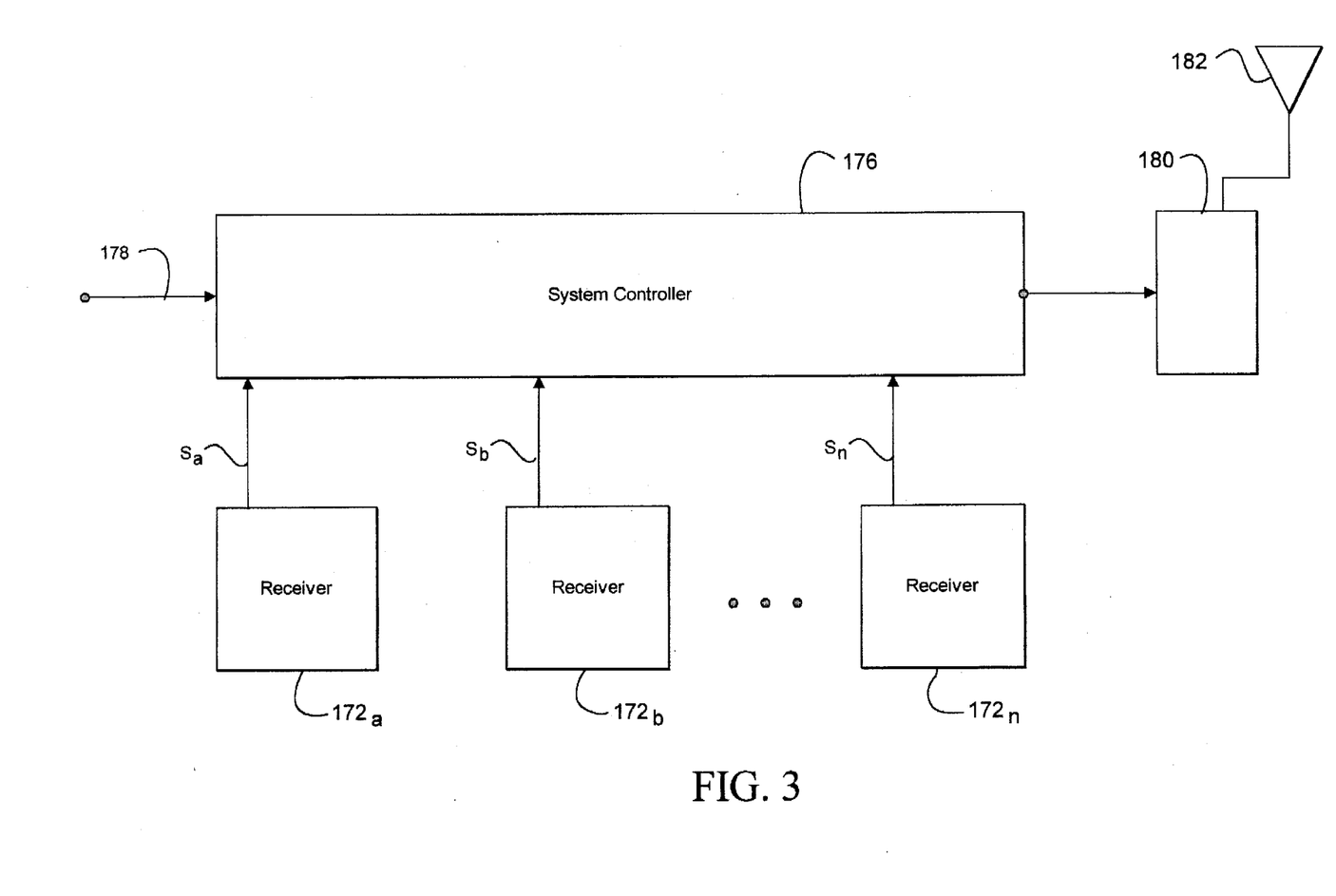
FIG. 3 is a schematic diagram of a portion of the base station of the present invention for determining a data rate and negotiating with a user terminal of the present invention.

FIG. 3 is a drawing showing, a schematic diagram of a portion of base station 102 which negotiates with gain control logic 136 of the user terminal and determines the appropriate bit rate and transmission power of that user terminal. Base station 102 comprises a plurality of receivers, such as receivers $172_a$, $172_b$, ..., and $172_n$, each receives wireless signal generated by all the user terminals. Based on the received wireless signal, each receiver generates a signal component. For example, receivers $172_a$, $172_b$, and $172_n$ generate signal components $S_a$, $S_b$, $S_n$, respectively. These components are coupled to a system controller 176.

System controller 176 receives service requests from one of the user terminals via a communication path 178. It determines (using an algorithm described below) the appropriate bit rate and transmission power that can be supported based on information in the signal components received from receivers $172_a$, $172_b$, ... and $172_n$. The result is modulated by a radio frequency processing unit 180 and then transmitted to the requesting user terminal via an antenna 182. The requesting user terminal may accept or reject the result. The requesting user terminal may later send another service request (i.e., re-negotiate) if the result is being rejected at the current negotiation.

Figure 4:
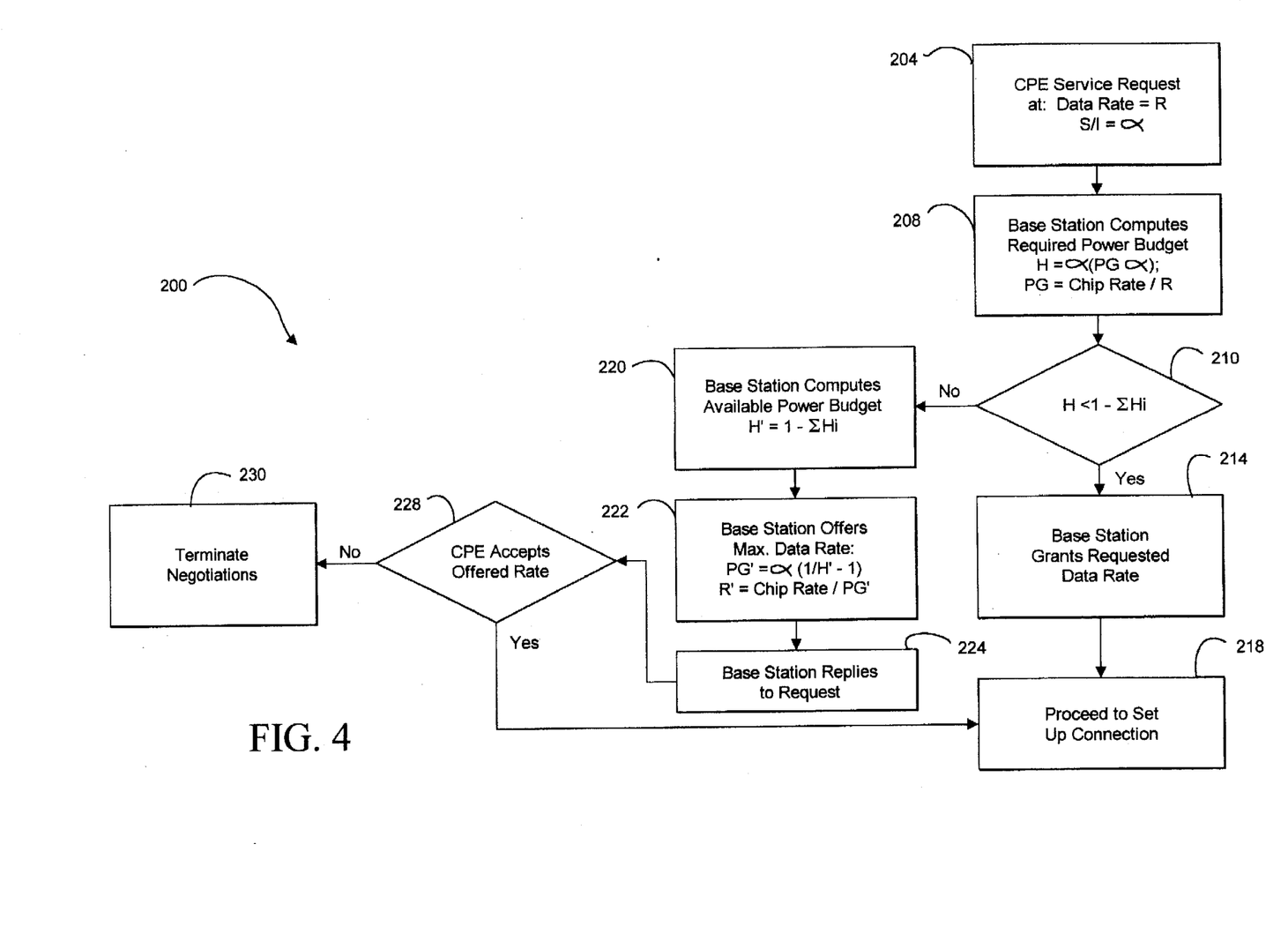
FIG. 4 is a flow chart of an algorithm used in the base station of the present invention for determining a data rate for a user terminal of the present invention.

FIG. 4 is a flow chart of an algorithm 200 used by system controller 176 for determining a data rate for a user terminal. System controller 176 receives a service request from a user terminal (such as terminal 104) specifying a desired data rate R and a desired BER (step 204). It is known that there is a direct relationship between BER and the ratio of signal component (S) and interference component (I). An example is BER=0.5 exp (–S/I) for a DBPSK modulation scheme. Other examples can be found in Proakis, J. H., "Digital Communications", 2nd Edition, McGraw Hill, 1989. In this specification, the ratio S/I is assigned a symbol a so as to facilitate the discussion that follows. The symbol "I" denotes the interference from all the other terminals. This ratio can be determined once the desired BER is known.

Upon receiving the above request, system controller 176 computes the required power budget (step 208). It first computes a processing gain (PG), which is defined as:

PG=chip rate/R.

In the present invention, the chip rate is fixed. One of the advantages of using a fixed chip rate is that the costs of equipments are reduced compared to the case where the chip rate could be varied. Another advantage is that a fixed chip rate corresponds to a fixed RF channel bandwidth. This makes frequency planning, and allocation considerably simpler because all cells and all channels in each cell occupy the same bandwidth. Thus, the PG is inversely proportional to the data rate R.

System controller 176 then computes a power budget H using the following formula:

H=α/(PG+α).

The power budget is simply the minimum fraction of the received power allocated to each user. Note that the power budget for all the users must add to less than or equal to one, assuming that there are no narrowband interferences. For example, for a set of three users, the power budgets may be 0.5, 0.3, and 0.1. In case of narrowband interferences, the total power budget is less than or equal to 1–δ where δ represents the fraction of the received power that belongs to the interferers.

In step 210, system controller 176 then compares H with the quantity (1−Σ H$_i$). The quantity H$_i$ is the power budget for user i to achieve its desired data rate and BER. The summation is performed over all active user terminals (i.e., excluding the requesting terminal). The comparison checks if the requested power budget is less than the available power budget. If the quantity H is less than (1−Σ H$_i$), flow chart 200 branches to step 214, in which case the requested data rate is granted. Flow chart 200 proceeds to set up the connection between the requesting user terminal and base station 102 (step 218). If the quantity H is greater than (1−Σ H$_i$), flow chart 200 branches to step 220, in which case system controller 176 computes an available power budget H' using the formula:

$$H' = 1 - \Sigma H_i.$$

The system controller may negotiate the data rate, BER, or both. For example, assuming the system controller negotiates only the data rate, then in step 222, system controller 176 determines a maximum data rate (R') for the requested α (i.e. BER) using the formula:

$$PG' = \alpha(1/H' - 1); \text{ and}$$

$$R' = \text{chip rate}/PG'.$$

Similarly the system controller can determine α' for the requested R or determine both α' and R' that satisfy the above equations. The formula for α is given by $$\alpha' = PG/(1/H' - 1)$$

In step 224, the base station sends a reply to the service request previously sent by the requesting user terminal in step 204. The reply indicates that R' is an offered data rate. The user terminal determines if the offered rate R' is acceptable (step 228). If the offer is accepted, flow chart branches to step 218 (i.e. set up connection). If the offer is not accepted, flow chart 200 terminates (step 230). When the user terminal wishes to re-negotiate with the base station, it could initiate the whole negotiation process again at that time.

As pointed out above, both the data rate and the transmission power are variable. Thus, in step 218, base station 102 informs the requesting user terminal the expected received user signal power S$_i$. The requesting user terminal can calculate the transmission power by estimating the propagation loss and adding, this to the expected received user signal power S$_i$. The estimation process is described in more detail below.

In the following disclosure, detailed implementations of the present invention in a time division duplexing, and a frequency division duplexing are disclosed. The reverse link (from the user terminals to the base station) and the forward link (from the base station to the individual user terminals) are separately discussed.

Reverse Link from the User Terminal to the Base Station:

In the reverse link, each user terminal wishing, to establish a connection transmits a Connection Request message specifying, the requested bit rate, which is selected from a set of supported bit rates, and a particular QOS parameter, such as BER. This operation corresponds to step 204 of flow chart 200 (see FIG. 4). The message is transmitted over a signaling channel. In the specific embodiment this channel is a Common Signaling Channel (CSC). The CSC is a separate channel that is shared by all the user terminals for service negotiation with the base station. In a TDD system the CSC is a separate time slot or frame while in a FDD system the CSC is a separate frequency carrier. If the message transmission is unsuccessful (e.g., there is a, collision with other user terminal transmissions), the base-station does not receive the message and does not respond. After a variable time-out period the user terminal re-transmits the request message. Note that other re-transmit schemes are possible.

If the message transmission is successful, the base-station responds with a Connection Response message that includes (a) the bit-rate at the particular BER that can be granted by the base-station to the user terminal for the existing traffic conditions and (b) the expected user signal power at the base station. Upon acceptance by the requesting user terminal, a connection is set up. This corresponds to step 218 of flow chart 200. The base-station determines the expected user signal power at the base station (which depends on the requested bit rate and BER) and the interference from other simultaneous users, as explained in flow chart 200.

The difference between the base station transmit power (which is a system parameter) and the received power at the user terminal is the propagation loss in the direction from base-station to user terminal. Assuming reciprocity, the propagation loss is the same in the direction from the user terminal to the base-station. Hence, the user terminal adds this propagation loss to the expected user power discussed above to arrive at the nominal transmit power. The user terminal either (i) accepts the connection by transmitting a Connection Accept message or (ii) rejects the connection (if the maximum bit-rate granted by the base-station is less than the user terminal requirements) by transmitting a different Connection Reject message. The user terminal may attempt the bit rate negotiation again at a later time.

For each user terminal that successfully negotiates a connection with the base-station, the source symbol stream is multiplied by its unique spreading code at a system-defined fixed chip rate resulting in a wideband signal at the fixed chip rate. The unique spreading code for a user terminal is any Pseudo-Noise (PN) code that generates near random cross-correlation properties over any out-of-phase sub-sequences. The processing gain for this user terminal is the ratio of the chip rate to the negotiated user bit rate. The user wideband signal is then modulated to the carrier frequency and transmitted at the nominal power calculated above. Now the user terminal transmit power level has to be continually adjusted due to changes in the received signal power (due to fading and/or mobility) and interference power (due to other user service requests) at the base station. These adjustments are based on power control commands sent by the base station to the user terminal. Based on the power control commands the user terminal increases or decreases the transmitted power by adjusting the control voltage of the power amplifier.

At the base station, the sum of all the received user signals is first demodulated from the carrier frequency to baseband. For each user signal, a receiver in the base station multiplies the wideband signal with the user-specific unique spreading code, defined above as a PN sequence, and integrates the signal energy over the symbol duration. The resulting signal consists of a signal (S) component and an interference (I) component. The S component constitutes the signal energy received over the user bit duration from coherently combining the energy in all the chips per user bit. The I component constitutes the sum of the energy received from all the other users, each obtained by randomly combining (due to the random cross-correlation properties of the PN sequence) the energies in all the chips per user bit. The S components are estimated by the measurement module in each receiver and the results are communicated to the system controller. For each receiver the system controller calculates the S/I ratio and compares it against the required S/I ratio to achieve the negotiated the BER for the corresponding user terminal. The relation between the required S/I and the BER depends on the modulation scheme (i.e., BPSK, DQPSK etc.).

The following, analysis is the basis for the flow chart 200. For an individual user the Signal-to-Interference (S/I) ratio is given by $S/I = S/\Sigma\ I_j = (PG)(S)/\Sigma\ S_j$ where PG is the processing gain for the user, $S_j$ is the signal energy for the other users j and the summation $\Sigma$ is over all the other users. For the desired BER, $S/I > \alpha$ where $\alpha$, are defined in the flow chart 200, is the Signal-to Interference ratio corresponding to the desired BER. Thus, $PG \cdot S/\Sigma\ S_j > \alpha$. If $S_T = S + \Sigma\ S_j$ represents the total received signal energy, then the above requirement can be re-written as Condition (1):

$$S/S_T > \alpha/(PG+\alpha). \tag{1}$$

Note that $\alpha/(PG+\alpha)$ was defined as the power budget H in the flow chart 200. In other words, the fraction of the received power from a user $S/S_T$ must be grater than the power budget H for that user. Note also that the power budget H is directly determined by the user requested bit-rate and BER.

In case of no narrowband interferers, as the summation of $S/S_T$ over all users equals 1, the summation of H over all users must be less than or equal to 1 from condition (1). Hence we have condition (2):

$$\Sigma\ H_i \leq 1 \tag{2}$$

where $H_i$ is the power budget for user i.

In case of narrowband interferers, the summation of $S/S_T$ over all users equals $1-\delta$, where $\delta$ represents the fraction of the total received power that comes from narrowband interferers. Obviously in this case (2) becomes $\Sigma\ H_i \leq 1-\delta$, thereby reducing the capacity of the system.

Link from the Base Station to the Individual User Terminals:

In the forward link, the base station transmitter applies a variable gain to each individual user signal before combining such that the (1) is satisfied. As the propagation environment in the forward link affects all signals equally, the ratio of the signals will not change even though the absolute signal levels decrease with increasing distance from the base station. Hence the signals received at an individual user terminal receiver will have the same $S/S_T$ ratio as sent by the base station and hence the negotiated BER value.

In order to further illustrate the present invention, an example is given below. Consider a system with two user terminals, $UT_1$ and $UT_2$, co-located with each other (to exclude propagation variations) with peak transmit powers of 1000 mW each and a single base station BS. $UT_1$ requests a 32 Kbps bit rate at a $10^{-3}$ BER for voice service and $UT_2$ requests a 128 Kbps bit rate at $10^{-5}$ BER for high-speed Internet access. Assume a system fixed chip rate of 4096 Kilo-chips per second (Kcps).

In the reverse link, the $UT^1$ bit stream is multiplied by a PN code at rate of 4096 Kcps (this corresponds to a processing gain of 128 (i.e., 4096/32)) and the $UT_2$ bit stream is multiplied by a PN code again at rate 4096 Kcps (this corresponds to a processing gain of 32 (i.e., 4096/128)). If DQPSK modulation is used, the required S/I ratio at the BS receiver for $UT_1$ and $UT_2$ for the requested BERs are 9 dB and 12 dB, respectively. (See, for example, FIG. 4.2.20 of Proakis, J. H., "Digital Communications", 2nd Edition, McGraw Hill, 1989). Now the $UT_1$ received signal has a processing gain of 21 dB (i.e., 10log128) and the $UT_2$ signal has a processing gain of 15 dB (i.e., 10log32). This corresponds to power budgets $H_1=0.06$ and $H_2=0.33$, respectively. Note that this satisfies (2). The $UT^1$ and $UT^1$ receive power levels are adjusted in the same ratio as the power budgets $H_1$ and $H_2$. Since the propagation losses are identical for both $UT_1$ and $UT_2$ (by assumption), the transmit power levels are also in the same ratio as $H_1$ and $H_2$. Hence, for example, $UT_1$ can have transmit power 60 mW and $UT_2$ can have transmit power 330 mW. The corresponding values of $S/S_T$ are 60/390 (=0.15) and 330/390 (=0.85), which satisfy (1).

In the forward link, the same spreading codes are used for $UT_1$ and $UT_2$ at the BS transmitter. The power budgets are again for $H_1=0.06$ and $H_2=0.33$ at the $UT_1$ and $UT_2$ receivers. This again satisfies (2). If the two signals are combined at the BS in the same ratio as the power budgets $H_1$ and $H_2$ they are received at each of the user terminals $UT^1$ and $UT^2$ in the same ratio. For example, the BS can transmit at 390 mW with 60 mW in the signal to $UT^1$ and 330) mW in the signal to $UT_2$. The corresponding values of $S/S_T$ are 60/390 (=0.15) and 330/390 (=0.85), which again satisfy (1).

Exemplary Embodiment:

An exemplary embodiment using CDMA is described. CDMA has certain inherent advantages over FDNM and TDMA in wide-area wireless communications networks (e.g., wireless loop and mobile cellular): (i) multipath propagation provides a diversity gain for CDMA RAKE receivers but instead causes intersymbol interference and the need for complex equalizers for TDMA systems, (ii) in CDMA systems no frequency planning is required that is common for FDMA and TDMA systems, and (iii) the interference-limited nature of CDMA allows "soft" capacity limits as compared with the "hard" capacity limits of TDMA and FDMA systems.

Figure 5:
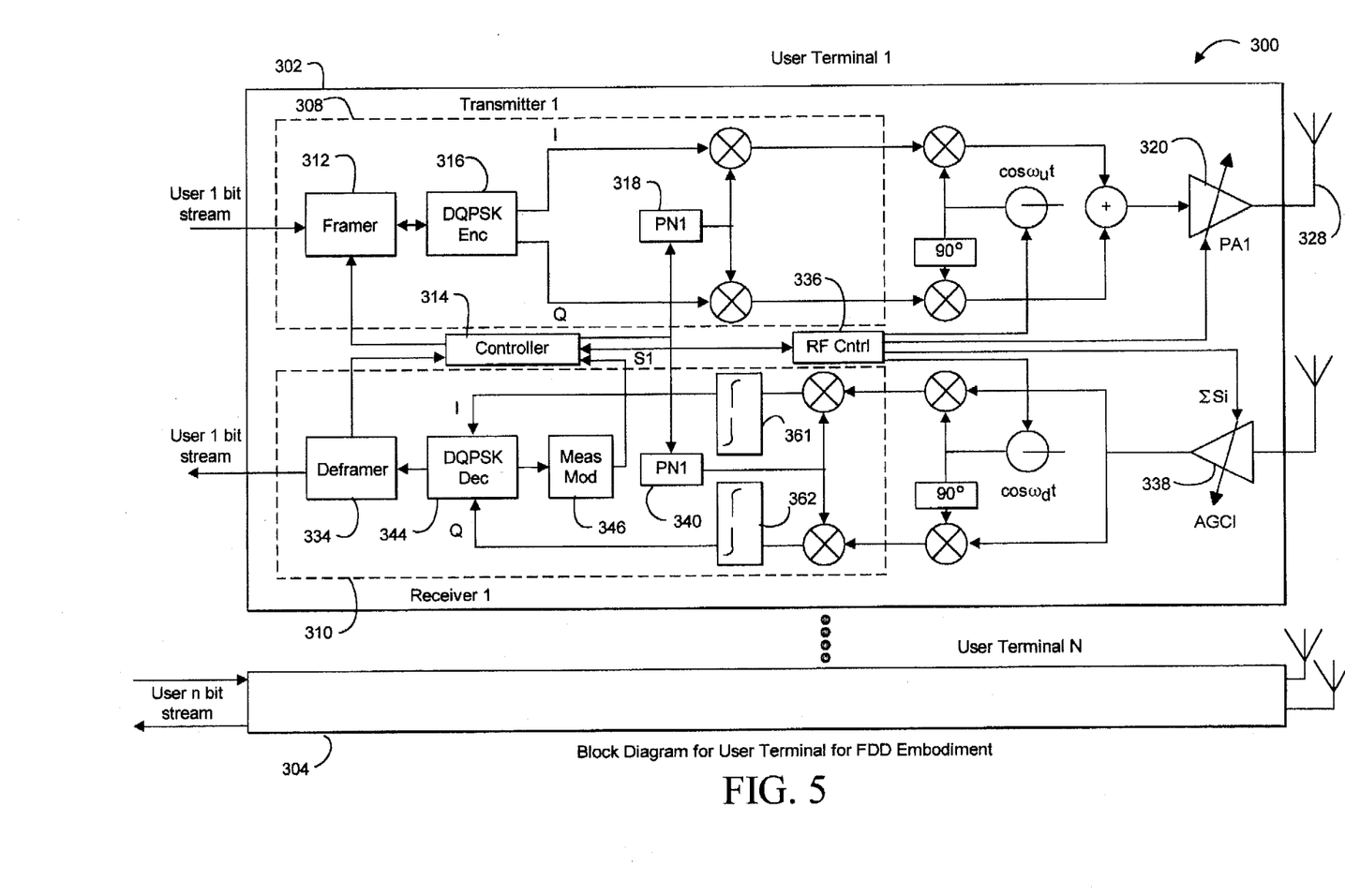
FIG. 5 shows a block diagram of the transmitter and receiver of a first embodiment of a user terminal with variable bit rate and negotiated QOS parameters in accordance with the present invention.

An apparatus 300 which can be used to implement an embodiment of the present invention is described herein. FIG. 5 shows a plurality of User Terminals, such as user terminal 1 (designated by numeral 302), . . . , and user terminal N (designated by numeral 304). Each user terminal contains a transmitter unit and a receiver unit. The transmitter and receiver units in all the user terminals are substantially identical. In FIG. 5, user terminal 302 contains a transmitter unit 308 and a receiver unit 310. Transmitter unit 308 consists of a Framer 312 which multiplexes user terminal source bit stream and control bit stream (containing control information and signaling messages generated by a Controller 314) into a single bit stream with rate selected from one of the multiple bit rates $2^L \times R$, where L=1,2, . . . n and R is the minimum bit rate, supported by the system. Framer 312 is connected to a DQPSK encoder 316 that generates the In-Phase (I) signal and the Quadrature-Phase (Q) signal, each at a symbol rate $2^{(L-1)} \times R$ DQPSK encoder 316 may be replaced by any other MPSK or differential MPSK encoder well-known in the existing art, including BPSK, DBPSK, and QPSK. DQPSK encoder 316 may also be replaced by any other linear modulation scheme like QAM. Note that non-linear modulation schemes like FSK are not suitable for this system.

The I and Q signals generated by encoder 316 are spread by a PN code generator 318 having, a PN code $PN_1$ operating at a chip rate C. The processing gain G defined as the chip rate divided by the symbol rate or $C/(2^{(L-1)} \times R)$. The length of the PN code $PN_1$ is much longer than the maximum processing gain C/R to allow for random cross correlation properties over any out-of-phase sub-sequences. The spread I and Q outputs of transmitter 308 are used to modulate an in-phase carrier (i.e., $\cos w_u t$) and the quadrature-phase carrier (i.e., $\sin w_u t$), respectively. In certain cases an optional half-chip delay unit is included to provide better spectral shaping. The output of the modulators are radio frequency signals that are combined, amplified via a variable gain amplifier 320 of value $PA_1$, and transmitted via an antenna 328 to the base station. The amplifier values (e.g., $PA_1$ for user terminal 302, ..., and $PA_n$ for user terminal 304) are set by commands from the base station. As explained below, the power control commands are decoded by Controller 314 after receipt from a Deframer 334 of receiver 310. Accordingly, Controller 314 adjusts the values of the variable gains in the RF Control block 336, which generates the control signal for the $PA_1$ gain value.

The base station transmits in this first embodiment on a different carrier frequency $w_d$ in accordance with an FDD arrangement. At the receiver side of user terminal 302, after the Automatic Gain Control circuit 338 ($AGC_1$), the received signal is demodulated in quadrature by multiplying by the sine and cosine signals to produce the baseband I and Q signals. The I and Q signals are then fed to receiver unit 310 and are de-spread by a PN code generator 340 having the same PN code $PN_1$ as that generated by generator 318. As a result, it is operating at the chip rate C. The de-spread I and Q signals are integrated over each symbol duration (by integrators 361 and 362, respectively) and are fed to a DQPSK decoder 344 for conversion into a binary bit stream of rate $2^L \times R$. The binary bit stream is connected to Deframer 334 for conversion back to the user terminal source bit stream and the control bit stream containing control information (e.g., power control commands) and signaling messages which are sent to Controller 314. A Measurement Module 346 estimates the signal energy $S_1$ from the de-spread I and Q signals and the DQPSK decoder output.

Controller 314 in User Terminal 302 implements all the control and signaling functions. The control functions include the configuration of the transmitter and receiver parameters, the initialization of the PN code generators, control of the oscillator frequencies $w_u$ and $w_d$, the gain control of the power amplifier and the measurement of the user signal strength $S_1$. Controller 314 also implements the signaling protocol, writing, messages (e.g. Connect Request) to Framer 312 and reading messages (e.g., Connect Response) from De-framer 334.

RF Control block 336 generates the control signals based on control values specified by Controller 314.

Figure 6:
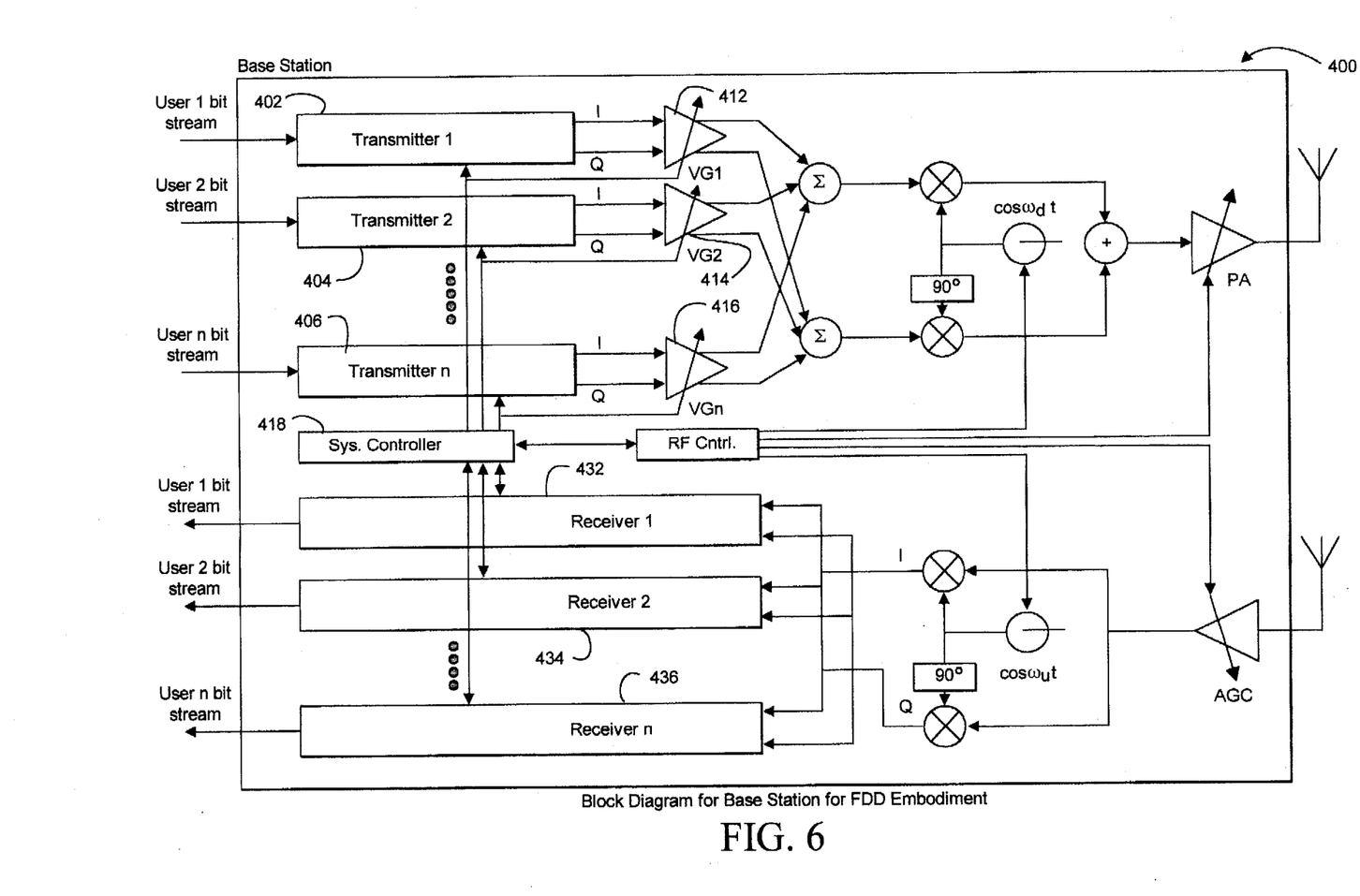
FIG. 6 shows a block diagram of the transmitter and receiver of the first embodiment of a base station supporting multiple user terminals with variable bit rates and negotiated QOS parameters.

FIG. 6 shows the transmitter and receiver units at a base station 400 which controls the User Terminals 302, ..., 304. It contains a plurality of transmitter units 402, 404, ... and 406. Each of these transmitter units are substantially the same as the transmitter unit of the user terminal in FIG. 5. The I and Q outputs of transmitter units 402, 404, ... and 406 are scaled by the units with variable gain units 412, 414, ... and 416, respectively, having gains $VG_1, VG_2, \ldots, VG_n$, respectively, before being combined and quadrature modulated to the carrier frequency $w_d$. The gain $VG_1, \ldots, VG_n$ values are calculated to provide the proper received power budgets for each of the user terminal signals as per the conditions (1) and (2) derived above. These $VG_1, \ldots, VG_n$ gains are implemented in the digital domain as simple multiplications and are set by a system Controller module 418. Controller module 418 is substantially the same as system controller 176 of FIG. 3.

Base station 400 contains a plurality of receiver units 432, 434, ... and 436. Each of these receiver units is substantially the same as the receiver unit of the user terminal in FIG. 5. In addition to providing the users with data streams, they also provide the corresponding control bit stream and signal strengths $S_1, \ldots, S_n$ to Controller 418.

Figure 7:
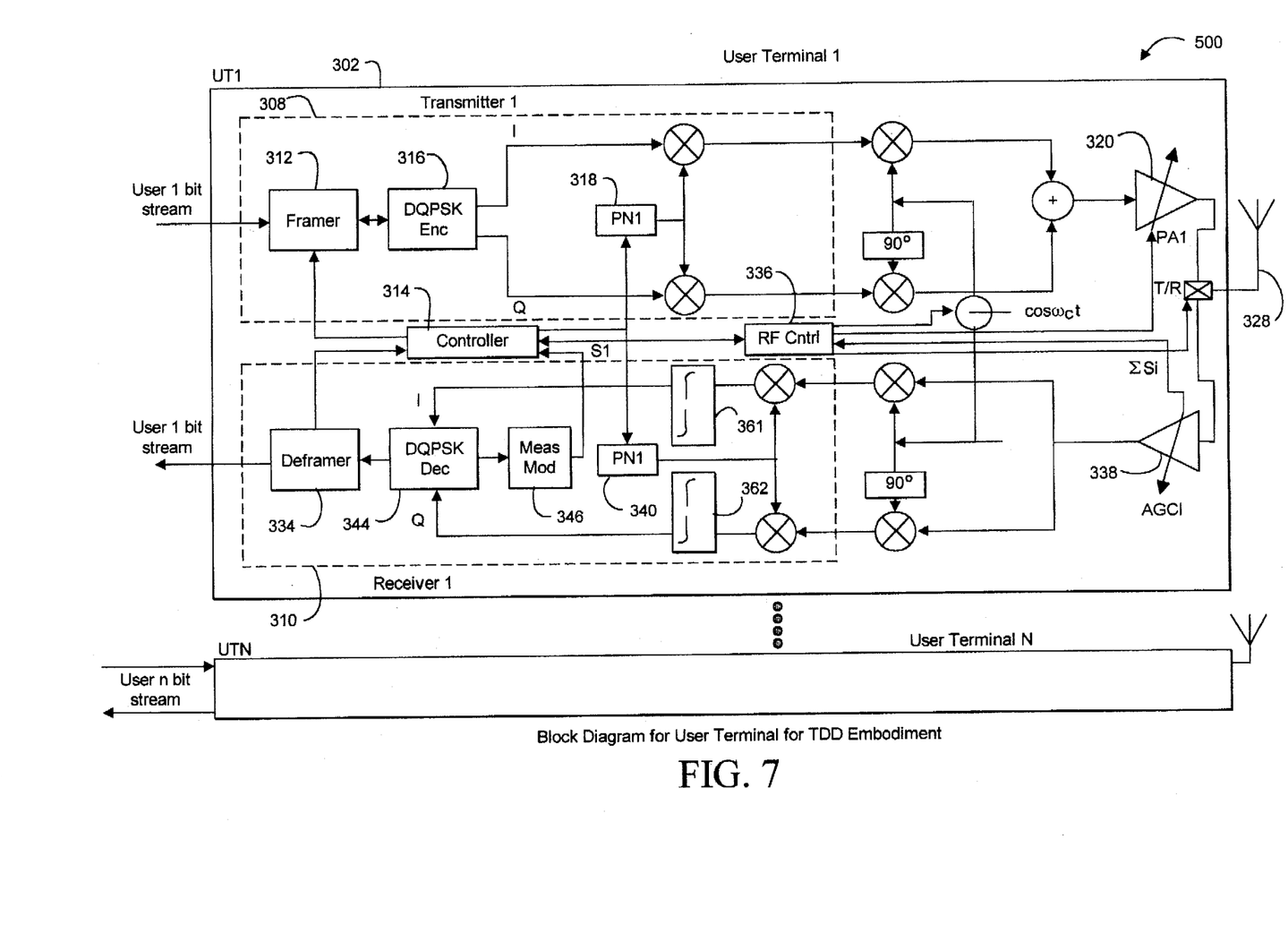
FIG. 7 shows a block diagram of the transmitter and receiver of a second embodiment of a user terminal with variable bit rate and negotiated QOS parameters in accordance with the present invention.
Figure 8:
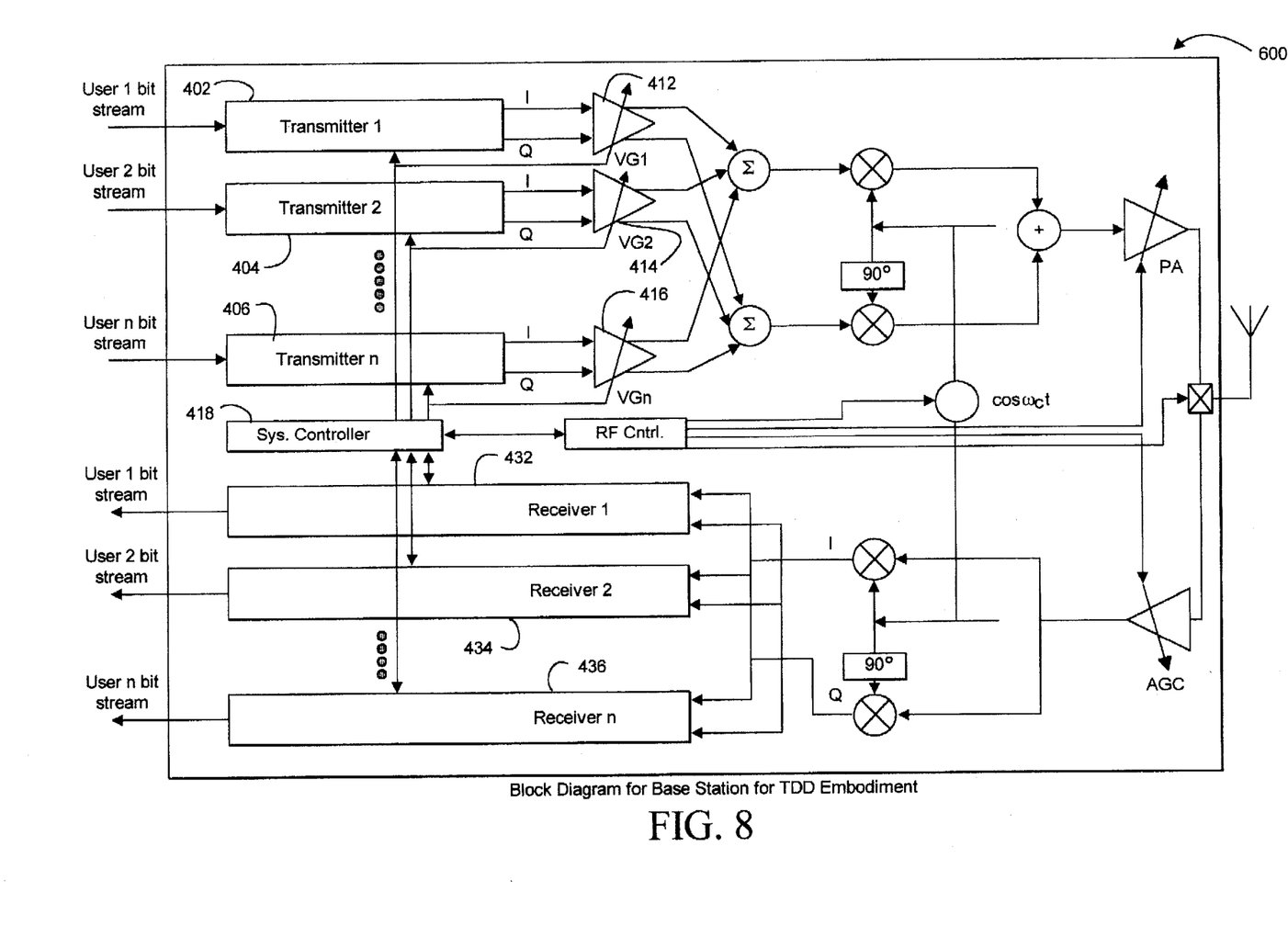
FIG. 8 shows a block diagram of the transmitter and receiver of a second embodiment of a base station supporting multiple user terminals with variable bit rates and negotiated QOS parameters.

FIGS. 7 and 8 show a second embodiment of this invention corresponding to a TDD arrangement where the same carrier frequency is used for both the forward and reverse links (i.e., $w_u = w_d$). Correspondingly, the chip rate is 2×C; otherwise, the transmitter and receiver units are unchanged for both the User Terminals and the base station. A Transmit/Receive ("T/R") switch connects either the transmitter unit or the receiver unit to the antenna. A block diagram of user terminals 500 is shown in FIG. 7 and a block diagram of base station 600 is shown in FIG. 8. Components in FIGS. 7 and 8 that are the same as components in FIGS. 5 and 6 are assigned the same reference numerals.

The invention now being fully described, it will be apparent to one of ordinary skill in the art that any changes and modifications can be made thereto without departing from the spirit or scope of the invention as set forth herein. Accordingly, the present invention is to be limited solely by the scope of the appended claims.

What is claimed is:

1. A multi-rate communication system having a base station communicating with a plurality of active user terminals, and a requesting user terminal, each of said user terminals having a transmitter and a receiver, said base station comprising:

means for receiving a message from said requesting user terminal to said base station, said requesting user terminal requesting communication using a desired data rate and a desired quality of service QOS parameter;

means for determining a suitable data rate, a suitable QOS, and expected received signal power for said requesting user terminal based on said desired data rate and said desired QOS; and means for communicating said suitable data rate, said suitable QOS, and said expected received signal power to said requesting user terminal.

2. The system of claim 1 wherein said means for determining further comprising:

means for computing a requested power budget for said requesting user terminal based on said desired data rate and said desired QOS;

means for computing a combined power budget for said active user terminals; and means for selecting a suitable data rate as equal to said desired data rate and a suitable QOS as equal to said desired QOS when a sum of said requested power budget and said combined power budget is less than one.

3. The system of claim 2 wherein said means for determining further comprising means for determining an available power budget for said requesting user terminal based on said desired data rate and said desired QOS when a sum of said requested power budget and said combined power budget is greater than one, said suitable data rate and said suitable QOS being related to said available power budget.

4. The system of claim 2 wherein said requesting user terminal communicates with said base station using, a device having, a fixed chip rate (C) and requiring a ratio $\alpha$ of a signal component and an interference component, where said $\alpha$ is determined by said desired QOS, said means for computing said requested power budget (H) calculating said H from:

$$H = \alpha/(PG + \alpha);$$

where PG=C/R and said R is said desired data rate of said requesting user terminal.

5. The system of claim 4 wherein said requesting user terminal further comprises:
   means for calculating propagation loss in a direction from base-station to said requesting user terminal;
   means for calculating nominal transmit power based on said propagation loss and said expected signal power communicated by said base station to said requesting user terminal; and
   means for controlling transmit power based on said nominal transmit power.

6. The system of claim 4 wherein said means for computing a combined power budget computes a sum of a power budget ($H_i$) of each active user terminal, said power budget $H_i$ being computed from:

$$H_i = \alpha_i / (PG_i + \alpha_i);$$

where $PG_i = C/R_i$ and $R_i$ is a data rate of said ith active user terminal, and
   $\alpha_i$ is a ratio of a signal component and an interference component of an ith active user terminal.

7. The system of claim 6 wherein said base station further comprises:
   means for calculating nominal transmit power to each said active user terminal and said requesting terminal such that for each of said active and requesting user terminals the ratio of transmit power to total transmit power exceeds said power budget $H_i$; and
   a variable gain unit for controlling transmit power to each said active user terminal and said requesting terminal based on said calculated nominal transmit power.

8. The system of claim 3 wherein said available power budget (H') is substantially equal to one minus said combined power budget.

9. The system of claim 8 wherein said requesting user terminal communicates with said base station using a device having a fixed chip rate (C) and requiring a ratio $\alpha$ of a signal component to an interference component, said means for computing said suitable data rate (R') calculating said R' from:

$$PG' = \alpha/((1/H')-1), \text{ and}$$

$$R' = C/PG'.$$

10. The system of claim 8 wherein said requesting user terminal communicates with said base station using a device having a fixed chip rate (C) and desired data rate R, said means for computing said suitable QOS (QOS') calculating said QOS' from:

$$PG = C/R, \text{ and}$$

$$\alpha' = PG/((1/H')-1), \text{ where}$$

$\alpha'$ is a ratio of a signal component to an interference component and is related to said QOS'.

11. The system of claim 8 wherein said requesting user terminal communicates with said base station using a device having a fixed chip rate (C), said means for computing said suitable data rate (R') and said suitable QOS (QOS') calculating said R' and said QOS' from:

$$R' = C/PG' \text{ and}$$

$$\alpha' = PG'/((1/H')-1);$$

where $\alpha'$ is a ratio of a signal component to an interference component and is related to said QOS', and $$1 \leq PG' \leq C/R.$$

12. The system of claim 8 wherein said available power budget H' is substantially equal to one minus said combined power budget minus $\delta$, where $\delta$ represents a fraction of total received power that comes from narrowband interferers.

13. The system of claim 1 wherein said base station communicates with said active and said requesting user terminals using a frequency division duplexing arrangement.

14. The system of claim 1 wherein said base station communicates with said active and said requesting user terminals using a time division duplexing arrangement.

15. The system of claim 1 wherein said means for communicating further comprises means for transmitting over a separate signal channel jointly used by said active and said requesting user terminals.

16. The base station of claim 1 further comprising a plurality of transmitter units, one for each of said user terminals, each of said transmitter units comprising:
   a framer unit for converting input user bit stream and control bit stream into the closest of one of a plurality of negotiated bit rates that is equal to the product of $2^L$ and R, where L=1,2, ... n and R is a minimum bit rate supported by said system;
   an encoder unit for generating, I and Q symbol streams each at a symbol rate equal to a product of $2^{(L-1)}$ and R;
   a unique code for spreading said I and Q symbol streams to a fixed chip rate I and Q chip stream;
   a variable gain unit for scaling said I and Q chip streams;
   a first combiner for combining said scaled I chip stream generated by said plurality of transmitter units of all said user terminals;
   a second combiner for combining said scaled Q chip stream generated by said plurality of transmitter units of all said user terminals;
   a quadrature modulator for modulating said combined I and Q chip streams generated by said first and said second combiners; and
   a variable gain power amplifier for amplifying said modulated signal.

17. The base station of claim 16 wherein said encoder is a general MPSK encoder.

18. The base station of claim 16 wherein said encoder is a differential MPSK encoder.

19. The base station of claim 16 wherein said encoder is a general QAM encoder.

20. The base station of claim 16 wherein separate unique spreading codes are used to generate said I and said Q symbol streams.

21. The base station of claim 1 further comprises a plurality of receiver units, one for each of said user terminals, each of said receiver units comprising:
   a variable automatic gain controller for amplifying a received signal;
   a quadrature demodulator for demodulating said amplified signal into an I and a Q chip streams;
   a unique code for de-spreading, said I and Q chip streams to an I and Q symbol stream;
   a first integrator for integrating said I symbol stream over a symbol duration;
   a second integrator for integrating said Q symbol stream over said symbol duration;
   a decoder unit for generating a received bit stream based on said integrated I and Q symbol streams; and
   a deframer for generating an output bit stream and a control bit stream based on said received bit stream.

22. The base station of claim 21 wherein said decoder is a general MPSK encoder.

23. The base station of claim 21 wherein said decoder is a differential MPSK encoder.

24. The base station of claim 21 wherein said decoder is a general QAM encoder.

25. The base station of claim 21 wherein separate unique de-spreading codes are used to generate said I and said Q symbol streams.

26. The system of claim 1 wherein each of said transmitters of said plurality of user terminals comprises:

a framer unit for converting input user bit stream and control bit stream into the closest of one of a plurality of negotiated bit rates that is equal to the product of $2^L$ and R, where L=1,2, ... n and R is a minimum bit rate supported by said system;

an encoder unit for generating, I and Q symbol streams each at a symbol rate equal to a product of $2^{(L-1)}$ and R;

a unique code for spreading said I and Q symbol streams to a fixed chip rate I and Q chip stream;

a quadrature modulator for modulating said I and said Q chip streams; and a variable gain power amplifier for amplifying said modulated signal.

27. The user transmitter of claim 26 wherein said encoder is a general MPSK encoder.

28. The user transmitter of claim 26 wherein said encoder is a differential MPSK encoder.

29. The user transmitter of claim 26 wherein said encoder is a general QAM encoder.

30. The user transmitter of claim 26 wherein separate unique spreading codes are used to generate said I and said Q symbol streams.

31. The system of claim 26 wherein each of said receivers of said plurality of user terminals comprises:

a variable automatic gain controller for amplifying a received signal;

a quadrature demodulator for demodulating said amplified signal into an I and a Q chip streams;

a unique code for de-spreading said I and Q chip streams to an I and Q symbol stream;

a first integrator for integrating, said I symbol stream over a symbol duration;

a second integrator for integrating said Q symbol stream over said symbol duration;

a decoder unit for generating a received bit stream based on said integrated I and Q symbol streams; and a deframer for generating an output bit stream and a control bit stream based on said received bit stream.

32. The user receiver of claim 31 wherein said decoder is a general MPSK encoder.

33. The user receiver of claim 31 wherein said decoder is a differential MPSK encoder.

34. The user receiver of claim 31 wherein said decoder is a general QAM encoder.

35. The user receiver of claim 31 wherein said unique de-spreading codes are used to generate said I and said Q symbol streams.

36. A method for a multi-rate wireless communication system having a base station and a plurality of active user terminals to allocate a data rate for a requesting user terminal, said requesting user terminal requesting a desired data rate (R) at a desired quality of service (QOS), said method comprising the steps of:

computing a requested power budget for said requesting user terminal based on said desired data rate and said desired QOS;

computing a combined power budget for said active user terminals; and granting, by said base station, said desired data rate and said desired QOS when a sum of said requested power budget and said combined power budget is less then one.

37. The method of claim 36 further comprising the steps of:

computing an available power budget for said requesting user terminal;

determining a suitable data rate and suitable QOS when a sum of said requested power budget and said combined power budget exceeds one, said suitable data rate and said suitable QOS being related to said available power budget; and sending said suitable data rate and suitable QOS to said requesting user terminal.

38. The method of claim 37 further comprising the step of determining a signal component of said requesting user terminal such that it operates within said available power budget.

39. The method of claim 36 wherein said wireless communication system has a fixed chip rate (C) and said requesting user terminal requires a ratio $\alpha$ of a signal component to an interference component, said requested power budget (H) being computed from:

$$H=\alpha/(PG+\alpha);$$

where PG=C/R and R is said desired data rate of said requesting terminal.

40. The method of claim 39 wherein said combined power budget is a sum of a power budget ($H_i$) of each active user terminal, said power budget $H_i$ being, computed from:

$$H_i=\alpha_i/(PG_i+\alpha_i);$$

where $PG_i$=C/$R_i$, and where $\alpha_i$ is a ratio of a signal component to an interference component of an ith active user terminal and $R_i$ is a bit rate of said ith active user terminal.

41. The method of claim 37 wherein said available power budget (H') is substantially equal to one minus said combined power budget.

42. The method of claim 41 wherein said wireless communication system has a fixed chip rate (C) and said requesting user terminal requires a ratio $\alpha$ of a signal component to an interference component, said suitable data rate (R') is computed from:

$$PG'=\alpha/(1/H'-1), \text{ and}$$

$$R'=C/PG'.$$

43. The method of claim 38 wherein said wireless communication system has a fixed chip rate (C) and said available power budget (H') is substantially equal to one minus said combined power budget, said signal component (S') of said requesting user terminal being computed from:

$$S'=\alpha'I;$$

$$\alpha'=PG/(1/H'-1) \text{ and}$$

$$PG=C/R;$$

where I is an interference component of said requesting user terminal, which in turn is calculated as I=(sum of all $S_j$)/PG, where $S_j$ is received near signal power from jth user terminal measured by said base station.

44. The method of claim 36 further comprising a step of modulating signals of said base station and said active and requesting user terminals.

45. The method of claim 37 wherein said sending step further comprises a step of transmitting over a separate signal channel jointly used by said active and said requesting user terminals.

46. The method of claim 36 further comprising the steps, executed by said base station, of:

converting a combined user bit stream and a control bit stream to one of a plurality of bit rates that is equal to a product of $2^L$ and R, where L=1,2, . . . n and R is a minimum bit rate supported by the system;

encoding, said converted bit stream into I and Q signals;

spreading said I and Q signals by a unique spreading code at a fixed chip rate to generate I and Q fixed rate chip streams;

scaling said I and Q fixed rate chip streams for each of said active user terminals to achieve the negotiated QOS;

summing said scaled I, Q fixed rate chip streams generated by transmitters of said active user terminals;

modulating said summed I and Q fixed rate chip streams to a reverse link frequency; and amplifying said modulated signal using a variable gain amplifier.

47. The method of claim 46 wherein separate spreading codes are used to generate said I and said Q symbol streams.

48. The method of claim 46 further comprising the steps, executed by each of a plurality of receiver units in said base station, of:

amplifying a received signal;

demodulating said amplified signal into an I and a Q chip stream;

de-spreading said I and said Q chip streams into an I and an Q symbol stream using a unique code;

integrating said I symbol stream over a symbol duration;

integrating said Q symbol stream over said symbol duration;

decoding a received bit stream based on said integrated I and Q symbol streams; and generating an output bit stream and a control bit stream.

49. The method of claim 48 wherein separate de-spreading codes are used to generate said I and said Q symbol streams.

50. The method of claim 36 further comprising the steps, executed by each of said active user terminals, of:

converting a combined user bit stream and control bit stream to one of a plurality of bit rates that is equal to a product of $2^L$ and R, where L=1,2, . . . n and R is a minimum bit rate supported by the system;

encoding said combined bit stream into I and Q signals;

spreading said I and Q signals by a unique spreading code at a fixed chip rate to generate I and Q fixed rate chip streams;

modulating said I and Q fixed rate chip streams to a forward link frequency; and amplifying said modulated signal at a level commanded by said base station.

51. The method of claim 50 wherein separate spreading codes are used to generate said I and said Q symbol streams.

52. The method of claim 50 further comprising the steps of:

amplifying a received signal;

demodulating said amplified signal into an I and a Q chip stream;

de-spreading said I and said Q chip streams into an I and an Q symbol stream using a unique code;

integrating said I symbol stream over a symbol duration;

integrating said Q symbol stream over said symbol duration;

decoding a received bit stream based on said integrated I and Q symbol streams; and generating an output bit stream and a control bit stream.

53. The method of claim 52 wherein separate de-spreading codes are used to generate said I and said Q symbol streams.

* * * * *

UNITED STATES PATENT AND TRADEMARK OFFICE
CERTIFICATE OF CORRECTION

PATENT NO.: 5,745,480

DATED: April 28, 1998

INVENTOR: Saman Behtash

It is certified that error appears in the above-identified patent and that said Letters Patent is hereby corrected as shown below:

Column 11, line 44, delete "PG' = $\alpha$ / ( (1/H') -1 )," and insert --PG' = $\alpha$  ( (1/H') -1 ),--.

Column 14, line 50, delete "PG' = $\alpha$ / ( (1/H') -1 )," and insert --PG' = $\alpha$  ( (1/H') -1 ),--.

Signed and Sealed this

Sixth Day of April, 1999

Attest:

Q. TODD DICKINSON

*Attesting Officer*     *Acting Commissioner of Patents and Trademarks*